United States Patent [19]
Light

[11] Patent Number: 5,880,734
[45] Date of Patent: Mar. 9, 1999

[54] PERIPHERAL VISION SIMULATOR FOR IMMERSIVE 3D VIRTUAL ENVIRONMENTS

[75] Inventor: John Light, Hillsboro, Oreg.

[73] Assignee: Intel Corporation, Santa Clara, Calif.

[21] Appl. No.: 726,063

[22] Filed: Oct. 3, 1996

[51] Int. Cl.$^6$ .................................................. G06T 17/00
[52] U.S. Cl. .......................................... 345/419; 345/425
[58] Field of Search ................................... 345/419, 420, 345/418, 421, 422, 425, 427

[56] References Cited

PUBLICATIONS

"Beating the Limitations of Camera–Monitor Mediated Telepresence with Extra Eyes," by Kimiya Yamaashi, Jeremy R. Cooperstock, Tracy Narine, and William Buston, CHI 96, Apr. 13–18, 1996 (1996 ACM 0–89791–777 Apr. 4, 1996.

*Primary Examiner*—Phu K. Nguyen
*Assistant Examiner*—Cliff N. Vo
*Attorney, Agent, or Firm*—William H. Murray; N. Stephan Kinsella

[57] ABSTRACT

Generation of a three-dimensional, immersed image display, by generating a straight-ahead three-dimensional view for display on a portion of a display area and generating at least one of a side peripheral, top peripheral, bottom peripheral and rear three-dimensional view for display on a contiguous substantial remainder of the display area. In an embodiment, the size of the display area used for displaying the one or more peripheral and/or rear views is adjustable. The field of view of the one or more peripheral and/or rear views preferably also is adjustable.

28 Claims, 8 Drawing Sheets

PERIPHERAL VISION SIMULATOR FOR IMMERSIVE 3D VIRTUAL ENVIRONMENTS

BACKGROUND OF THE INVENTION

1. Field of the Invention

This invention relates to three-dimensional (3D) graphics.

2. Background of the Related Art

Systems for the processing and display of 3D graphics typically include the display on a display device such as a video monitor of an imaginary or real place or object so as to provide a viewer with a sensation that the place or object exists in three dimensions. This typically is accomplished by providing visual cues, such as scaling down the size of distant objects or showing certain objects partially blocked by others, to impart to the viewer the impression of being in a 3D environment.

The computer-generation of 3D graphics on the screen of a video monitor is a well-known process. It consists of generating a set of three-dimensional (x, y, z) coordinates and performing a computer-generated series of transformations on the coordinates. The coordinates represent the objects in the scene. The transformations represent how the viewer sees the objects on the screen.

3D graphics programming is usually performed utilizing a software library that allows the programmer to program 3D graphics without concerning himself with various details of placing pixels on the screen. There is a great deal of similarity in the operation of the various software libraries, and anyone skilled in the art of using one library would have sufficient skill to use any of the other libraries. Thus, the choice of which library to use is an implementation detail.

The method of representing objects in 3D varies somewhat between software libraries, although the primary meaning of a set of coordinates is always the same. Various methods exist for defining and coloring surfaces of objects in a scene, but these methods are easily translated between libraries.

The transformations applied to coordinates by various 3D software libraries almost always have the same meaning. The transformations typically consist of a 4×4 matrix of numbers. It is well known in the art how to mathematically apply one or more transformation matrices to a set of coordinates to provide 3D effects on the computer screen. Transformation matrices are chosen so that there is an analogy between the mathematics of 3D rendering and our understanding of how pictures are taken by a photographic camera. The camera analogy is well understood by persons skilled in the art of computerized construction of 3D images, and its use greatly simplifies such discussions.

Immersive 3D environments are environments in which the viewer is given the impression of being brought into and navigating within the 3D environment. Many 3D graphics environments are not immersive. In non-immersive 3D environments, a viewer is merely provided with the sensation of being placed in front of the 3D scene and looks in. One recent use of immersive 3D graphics is virtual reality (VR), which attempts to give the viewer the impression of being inside a 3D representation of a real or imaginary place. The growing availability of VR graphics tools has resulted in the viewer being placed inside more or less abstract 3D scenes.

With VR, the viewer is immersed in a 3D scene, but the viewer still lacks important perceptual tools that are available to people in the real world. Specifically, typical views of VR provide little or no perceptual context. For example, a viewer of a VR system experiences "tunnel vision," in which the video monitor appears to be window placed several feet from the viewer through which he or she views objects and places on the other side of the window. This limits the viewer's field to a few degrees, eliminating most of the normal field of vision. This lack of perceptual context can limit effective use of the 3D presentation with effects varying from missed sightings to physical nausea on the part of the viewer.

Objects "behind" the viewer in 3D space must be treated as real even though they are not immediately visible, if an effective presentation and impression on the viewer is to be made. For example, if the viewer faces a tree, turns around, and walks backward, he will "hit" the tree in 3D space even though he cannot "see" it. Or, if the viewer walks past a tree too closely, he will hit the tree. In real life, one is aware of these objects through mechanisms such as peripheral vision and quick head turns.

Current VR technology has used various methods to attempt to provide visual context and to compensate for the lack of peripheral vision. These methods include wide angle views of the scene (like a fish-eye lens), an approximation of quick head turns (looking left and right), and overhead maps centered on the viewer. However, wide angle views distort the scene, and an approximation of quick head turns can be disorienting to the viewer. One technique used inside virtual vehicles (e.g., a tank) involves showing views out of front and side windows, without any attempt to connect or relate the views.

SUMMARY OF THE INVENTION

Generation of a three-dimensional, immersed image display, by generating a straight-ahead three-dimensional view for display on a portion of a display area and generating at least one of a side peripheral, top peripheral, bottom peripheral and rear three-dimensional view for display on a contiguous substantial remainder of the display area.

BRIEF DESCRIPTION OF THE DRAWINGS

The following detailed description will be more fully understood with reference to the accompanying drawings in which.

DETAILED DESCRIPTION OF A PREFERRED EMBODIMENT

Intelligent movement in a real or artificial 3D world requires an awareness of surroundings. The awareness is obtained from cues to various senses such as forward and peripheral vision and hearing. Forward and peripheral vision are often augmented by quick turns of the head to redirect the viewer's eyes. In the absence of such cues, intelligent movement in the world is limited.

The present invention provides a form of peripheral vision to a 3D graphics environment to enhance the VR experience of the viewer and to mitigate the anxiety which otherwise would be felt by a viewer because of the absence of cues to the surroundings provided by peripheral vision.

Figure 1:
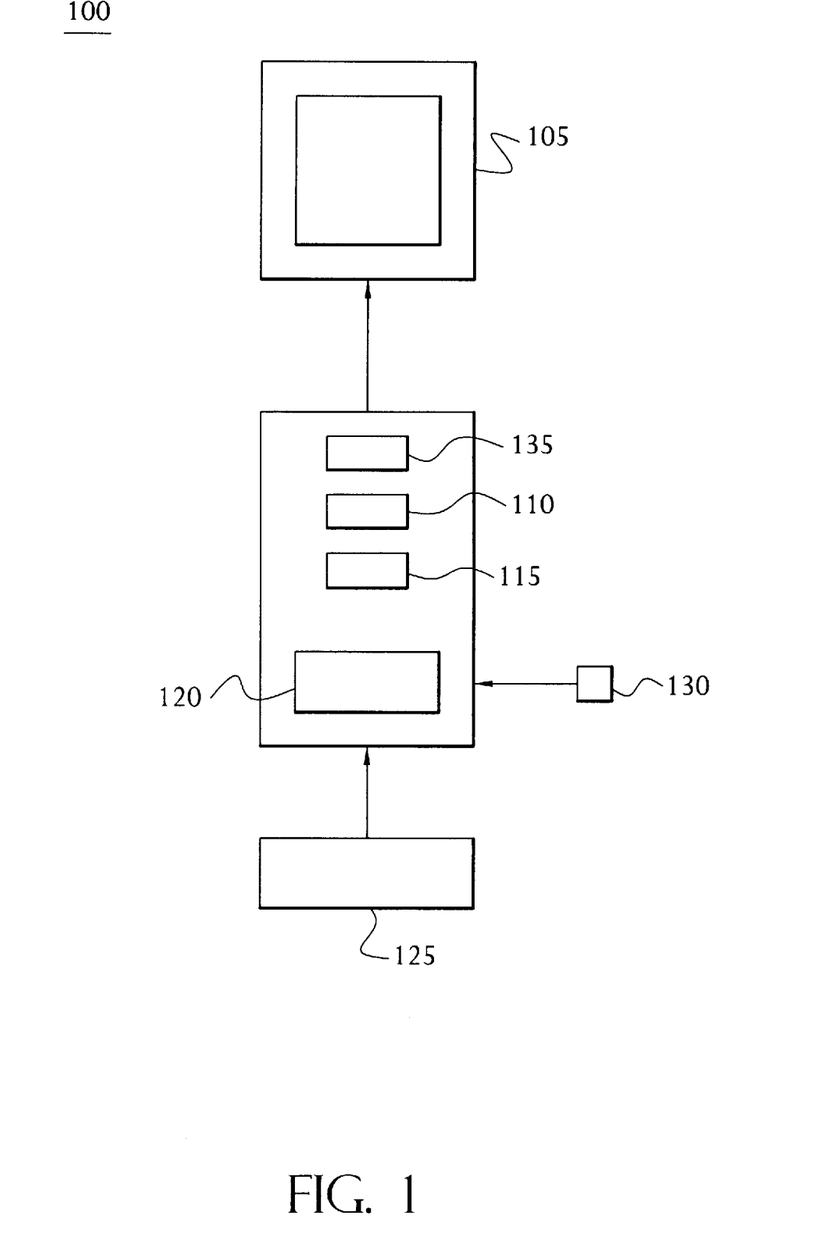
FIG. 1 is an embodiment of a PC for rendering 3D graphics in accordance with the invention.

Referring now to FIG. 1, in one embodiment, 3D graphics are rendered on an appropriate viewing device, such as a viewing headset or monitor, such as on computer monitor 105 of personal computer (PC) 100. PC 100 preferably has an advanced processor 110, such as an Intel Corporation Pentium® processor or Pentium® Pro processor, and a graphics subsystem 135 capable of rendering 3D graphics on monitor 105. PC 100 further includes main memory 115 and mass storage 120. Keyboard 125 and mouse 130 provide means for a user of PC 100 to physically interface with any application running on PC 100, such as one that has been loaded into main memory 115. Keyboard 125 and mouse 130 therefore provide a mechanism through which a user may interact with and navigate through a 3D graphics environment rendered, for example, on monitor 105.

Figure 2:
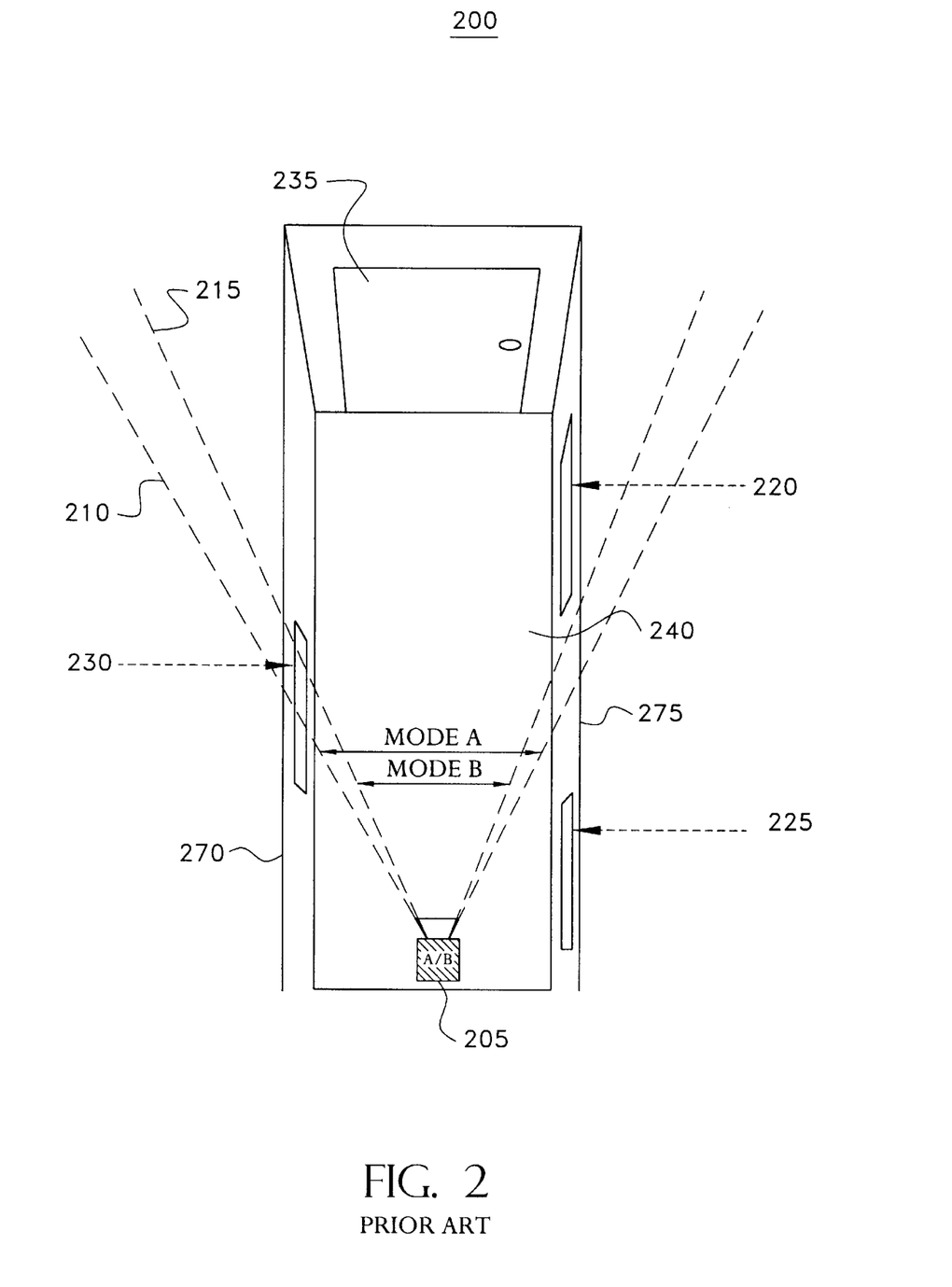
FIG. 2 shows a simulated top view of a conventional 3D view which can be rendered by a conventional 3D graphics system.

FIG. 2 shows a simulated top view of a conventional 3D view 200 which can be rendered by a conventional 3D graphics system. Virtual camera 205 represents a viewer's position in the simulated 3D environment and operates in normal field of view mode A and narrow field of view mode B to provide alternate fields of view 210 and 215, respectively. In another embodiment, virtual camera 205 operates in only a single mode to provide only a single field of view, but further virtual cameras can be substituted to provide slightly different view fields. View 200 shows a hallway terminating with a door 235. The hallway includes features 220, 225 and 230, which are, for example, pictures, mirrors, windows, lights or any other object one might find located in or on a hallway wall.

Figure 3:
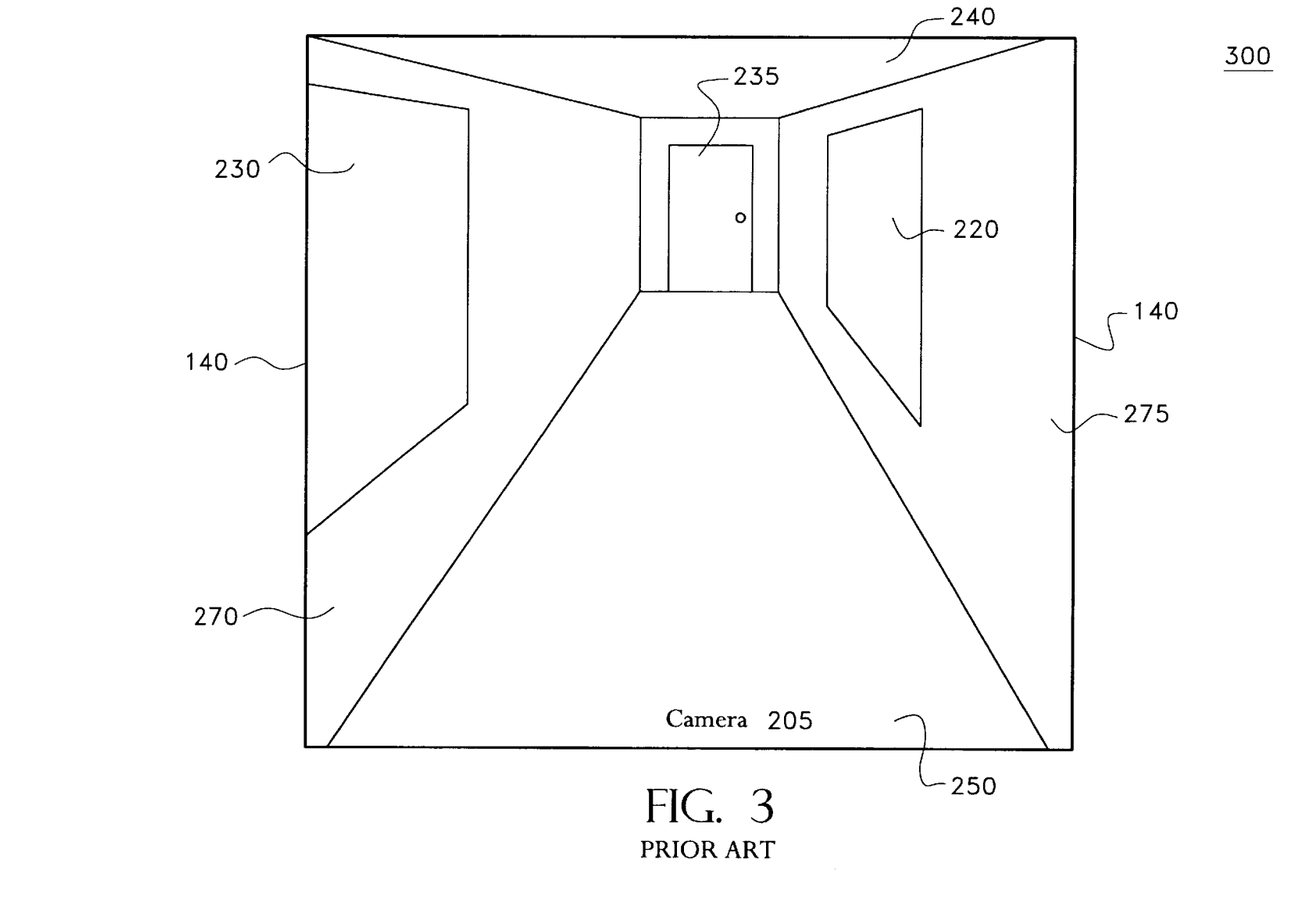
FIG. 3 is the rendering of the conventional 3D graphics view of FIG. 2.

FIG. 3 is a rendering 300 of the conventional 3D graphics view represented by view field 210, for example, as generated by virtual camera 205 operating in normal field of view mode A. It should be understood that the view 300 provided by virtual camera 205 can be computer generated and rendered on monitor 105 of PC 100. View 300 encompasses all or nearly all of viewing window 140. Viewing window 140 can be all of the viewing area provided by the viewing device, such as monitor 105, or some portion or window of the viewing area provided. Typically, the size of viewing window 140 is user adjustable. Feature 220 appears somewhat distant from a viewer of front view 300. Feature 230 is nearly visible in its entirety. Also visible in front view 300 is hallway ceiling 240, hallway floor 250, and hallway walls 270 and 275.

Figure 4:
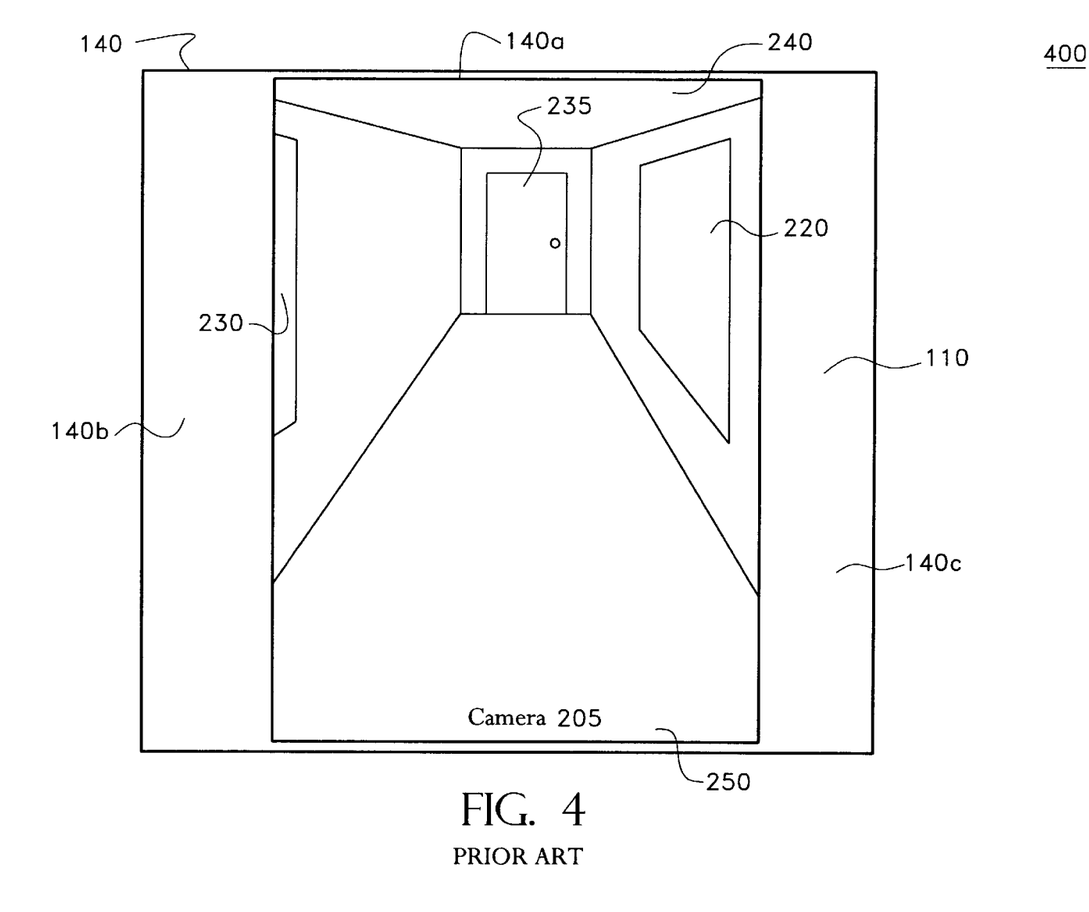
FIG. 4 is another rendering of the conventional 3D graphics view of FIG. 2.

FIG. 4 is a rendering view 400 of the conventional 3D graphics view represented by view field 215 as generated, for example, by virtual camera 205 operating in narrow-angle mode B. It should be understood that the view 400 provided by virtual camera 205 can be computer generated and rendered on monitor 105 of PC 100 or other suitable viewing apparatus. View 400 does not encompass the entire viewing window 140 being provided. Outside sections 140b and 140c of viewing window 140 do not display any part of view 400. Feature 220 appears much closer to the viewer and feature 230 is nearly entirely absent from view 400.

Figure 5:
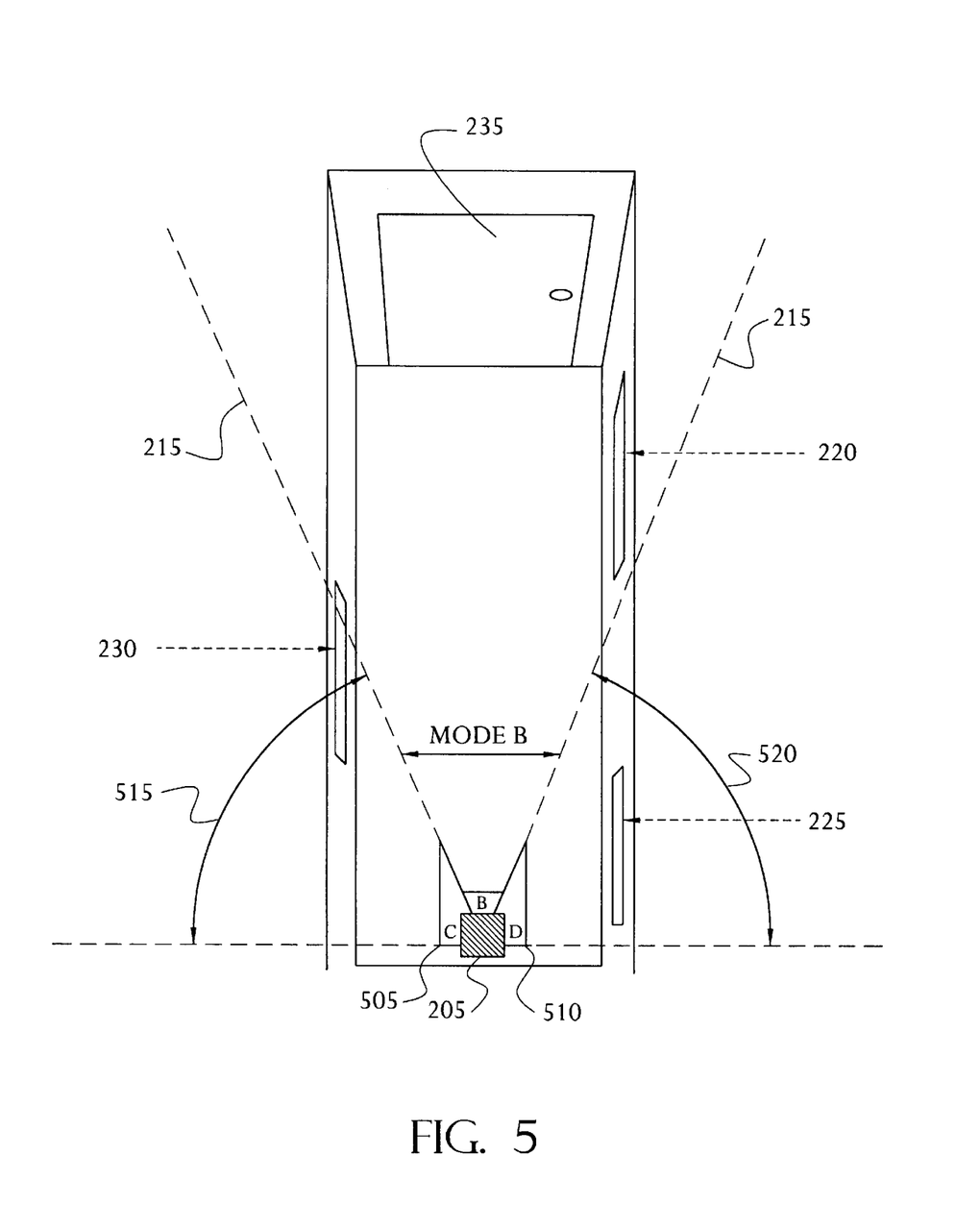
FIG. 5 is a simulated top view of a 3D view which can be rendered by an embodiment of the invention for providing simulated peripheral vision.

FIG. 5 is a simulated top view of 3D view 500 which can be rendered by an embodiment of the invention for providing simulated peripheral vision to an immersive 3D viewing environment. Virtual cameras 505 and 510 are positioned on each side of virtual camera 205. Virtual camera 205 is operated in narrow-view mode B to provide view field 215. Virtual cameras 505 and 510 provide wide-angle views 515 and 520, respectively. Wide-angle views 515 and 520 preferably merge with narrow-angle view 215 provided by camera 205. Again, it should be understood that the actual "views" provided by virtual cameras 505 and 510 are computer generated.

Figure 6:
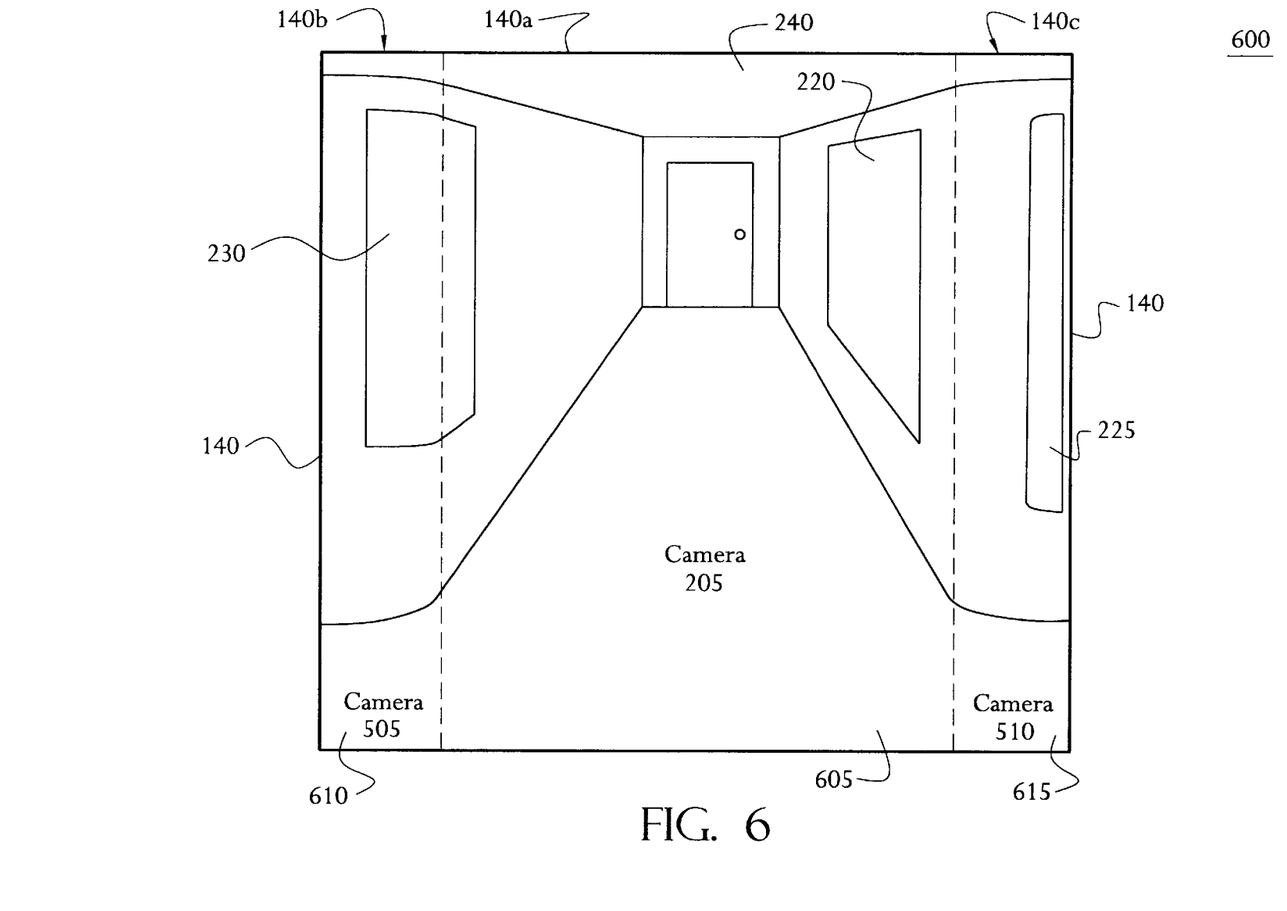
FIG. 6 is the rendering of the 3D view of FIG. 5 in accordance with the invention.
Figure 9:
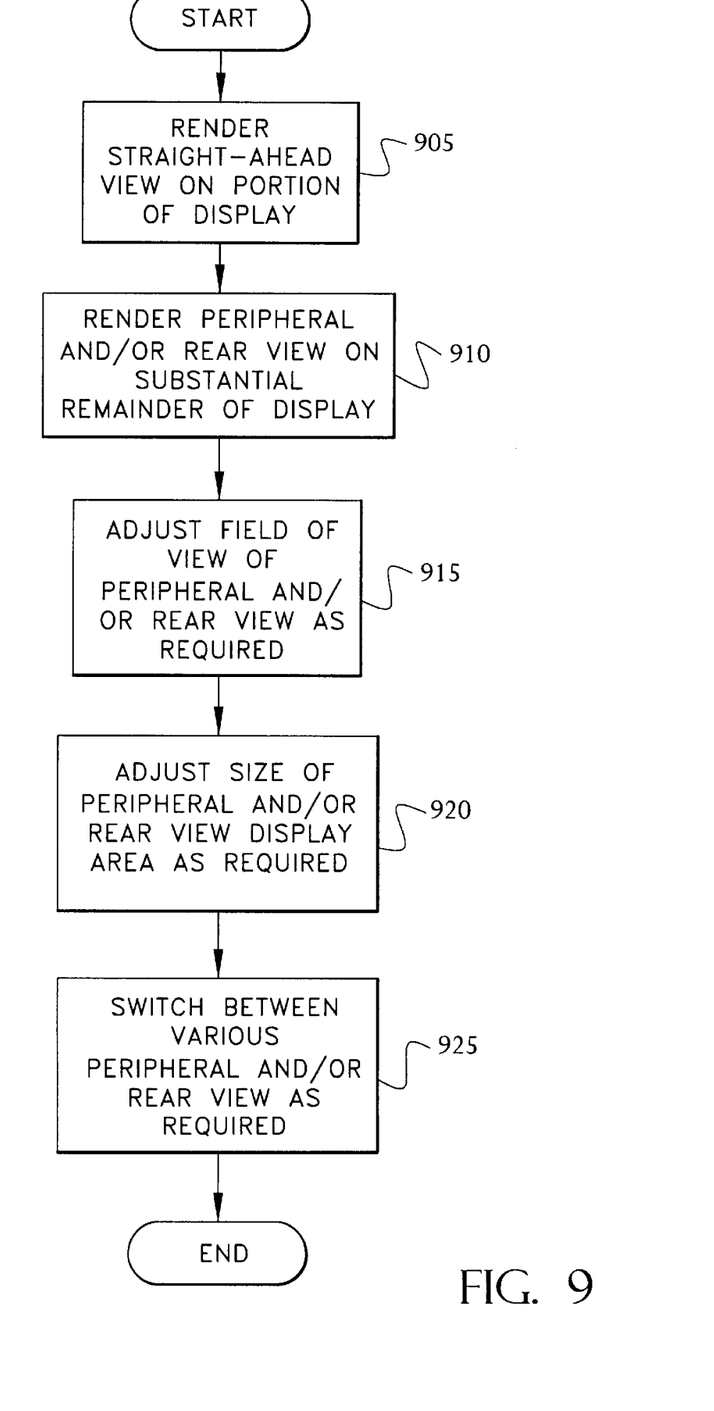
FIG. 9 is a flow chart of steps taken when using the invention.

FIG. 6 is a rendering 600 of the immersive 3D view provided by the present invention for providing simulated peripheral view to 3D graphics. Rendering 600 has straight-ahead 3D view 605, for example as provided by camera 205 operating in its narrow-view mode B (step 905 of FIG. 9). Accordingly, view 605 essentially corresponds to view 400 of FIG. 4 and occupies section 140a of viewing window 140. Views 610 and 615, provided by virtual cameras 505 and 510, respectively, provide a viewer with a peripheral perspective, and occupy outside sections 140b and 140c of viewing window 140 (step 910). For example, rendering 600 shows feature 230 in its entirety, with a portion of feature 230 wrapping from straight-ahead view 605 to peripheral view 610. In the straight-ahead 3D view 400, only a very small portion of feature 230 is visible. Feature 225 which, as shown in view 500 of FIG. 5, is nearly directly at the side of the viewer, is represented in rendering 600 in peripheral section 615. No part of feature 225 is visible in straight-ahead view 605, indicating that its position is out of the straight-ahead view of a viewer having a simulated position corresponding to virtual camera 205. Thus, no part of feature 225 is visible in either rendering view 300 or 400 of FIGS. 3 and 4, since these views represent view fields 210 (mode A) and 215 (mode B) without utilizing peripheral sections such as peripheral section 615.

As shown in rendering 600 of FIG. 6, the invention adds simulated peripheral views to an immersive 3D graphics viewing environment to supplement the conventional straight-ahead view. The invention adds more realism to the view and helps reduce subconscious anxieties and agitations caused by the peripheral-vision blindness associated with conventional 3D graphics. In one embodiment, peripheral views 610 and 615 are slightly distorted and appear as if captured through a fish-eye lens (note the curves effect) to impart to the viewer the sense that the images in views 610 and 615 are not part of straight-ahead view 605.

As shown in rendering 600 of FIG. 6, the invention preferably renders the 3D scene on the entire viewing area of window 140. The invention uses side areas 140b and 140c of viewing window 140 to render views 610 and 615, which relate to the parts of the scene that are adjacent to the parts of the scene in straight-ahead view 605 but that are not visible in that view. The main, straight-ahead view 605 is left unchanged.

Figure 7:
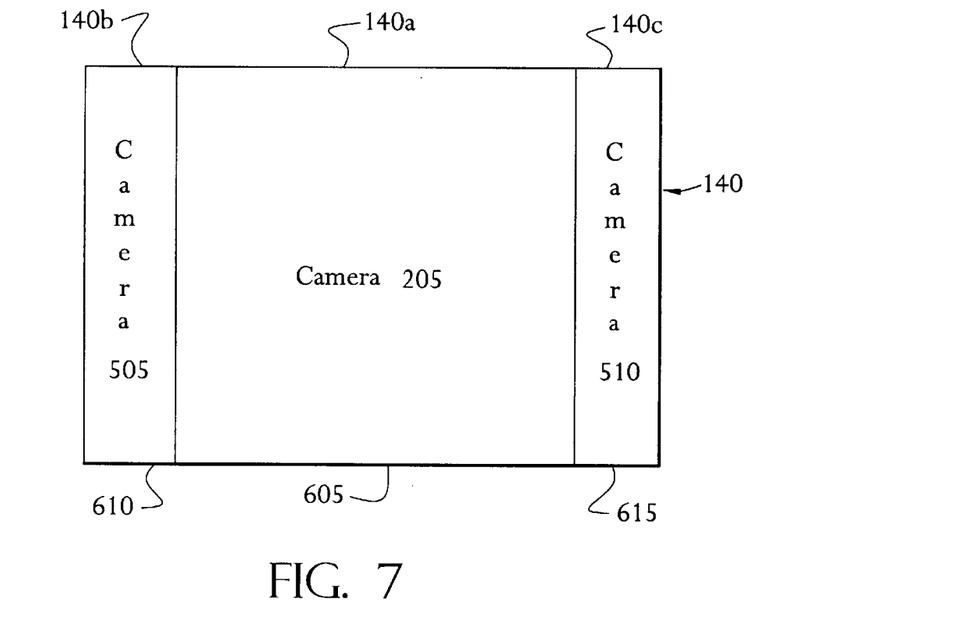
FIG. 7 is an embodiment of a viewing window showing a 3D view as rendered by the invention.
Figure 8:
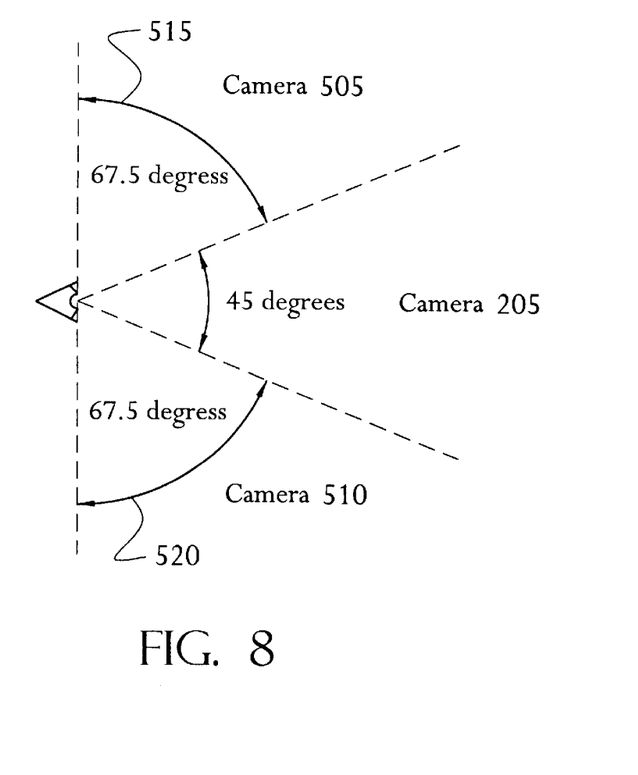
FIG. 8 is a representation of the viewing angles encompassed by each section of the 3D view rendered by the invention.

FIG. 7 is an embodiment of a viewing window 140 as rendered by the invention. The main, straight-ahead view 605 is provided by virtual camera 205 and occupies viewing window section 140a (step 905). In the embodiment shown, virtual camera 205 provides a straight ahead view which can be, for example, a field of view of approximately 45 degrees from the viewer's apparent position, as shown in FIG. 8. Cameras 505 and 510 typically provide wide-angle views, which occupy viewing window portions 140b and 140c, respectively (step 910). The views 610 and 615 on window portions 140b and 140c, respectively, are a mapping of the views on each side of the main viewing area 605, for providing peripheral vision to the viewer. The views provided on viewing window portions 140b and 140c can simulate any radius of view but as shown in FIG. 8, preferably simulate 67.5 degree view fields on each side of a viewer's forward looking view to approximate human peripheral vision. In one embodiment, the view fields of virtual cameras 505 and 510 can provide rear views. It should be understood that any view which is not a straight-ahead view or a peripheral view is a rear view. In any event, the radii of view angles represented by views 610 and 615 provided on screen portions 140b and 140c, respectively, preferably are selectable by the viewer (step 915). Knowing the radius of view provided on view window 140, a viewer is provided with an awareness of the virtual surroundings encompassed by the view.

In one embodiment, the viewer can select the amount of view window 140 which is dedicated to display the straight-ahead view vis-a-vis the periphery (step 920). For example, by appropriate instructions, a viewer can adjust the relative sizes of viewing window portions 140a, 140b and 140c to accommodate the task or action at hand. For example, when remaining still in the 3D environment or to read text rendered in the view window, it is be desirable to fully enlarge viewing window section 140a such that straight-ahead view 605 encompasses the entirety of view window 140. Other situations, such as 3D action games, require a complete understanding of the surrounding virtual environment, in which case side viewing window sections 140b and 140c can be enlarged as necessary to show significant amounts of peripheral views 610 and 615.

The foregoing description of the invention and referenced figures show the side peripheries 610 and 615 of a straight-ahead view 605 being mapped onto side sections 140b and 140c of view window 140 which have been reserved for such purpose. It should be understood that peripheral views are not limited to sides and that the invention can be used to map top and bottom peripheral views, preferably onto top and bottom sections of a view window which have been reserved for such purpose, and rear views. It also should be understood that any peripheral view, whether it be a top, bottom, side or rear view, can be individually mapped to an appropriate section of view window 140, without regard to whether any other views also are being mapped. Moreover, a user may switch between the display of the various peripheral and rear views (step 925). A user is thus able to customize the view presented according to a direction of navigation in the simulated 3D environment. For example, a game-player flying a virtual aircraft in a rapid ascent might wish only to see a top peripheral view. Once leveled off at a constant altitude, the game-player might wish to be provided with top, bottom and side peripheral views. Whichever peripheral view or views are shown, continuity should exist between the main view 605 on view window 140a and the section or sections of the view window displaying the peripheries. Since no real benefit accrues from providing continuity between contiguous edges of peripheral views, processing resources can be preserved by allowing contiguous edges of peripheral views to be discontinuous.

In one embodiment, the scene in the main viewing window and that in one or more peripheral viewing windows are continuous in the first derivative. For example, a horizontal line defining a top or bottom of a doorway which is partially in the main view and partially in the peripheral view will meet at the juncture of the main and peripheral views at a same angle. In an embodiment which requires less rendering power, the scenes can be generated so as to be continuous in function value only, i.e., the horizontal edge of the doorway will meet at the juncture of the main and peripheral views, but not at the same angle. In a less preferred ) embodiment, there may be no continuity between main and peripheral views.

In a further embodiment intended to minimize use of rendering resources, the peripheral views can be rendered at a low display quality as compared with the straight-ahead views. For example, the peripheral views may be displayed with fewer colors or lower resolution than the scene in the main view.

It should be understood that when generating a three-dimensional immersed image display on monitor 105 of PC 100, user input, including but not limited to varying the size of the display area dedicated to peripheral and/or rear display, adjusting the view field of the peripheral and/or rear views and selecting amongst various peripheral and/or rear views for display can be made through keyboard 125 and/or mouse 130. When generating the three-dimensional immersed image display of the invention on other viewing devices, other appropriate inputs means can be used.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented method for generating a three-dimensional, immersed image display, comprising the steps of:

(a) generating a straight-ahead three-dimensional view for display on a portion of a display (b) generating at least one of a side peripheral, top peripheral, bottom peripheral and rear three-dimensional view for display on a contiguous substantial remainder of the display area, wherein the at least one side peripheral top peripheral bottom peripheral and rear three-dimensional view is continuous with the straight-ahead view.

2. The method of claim 1, wherein the at least one side peripheral, top peripheral, bottom peripheral and rear three-dimensional view is distorted as compared to the straight-ahead view.

3. The method of claim 1, wherein the at least one side peripheral, top peripheral, bottom peripheral and rear three-dimensional view is distorted to appear as if captured through a fish-eye lens.

4. The method of claim 1, wherein step (b) comprises the step of generating a left side peripheral and right side peripheral view for display on left and right portions of the display area, respectively.

5. The method of claim 4, wherein:

the left and right side peripheral views are distorted as compared to the straight-ahead view; and the left and right side peripheral views are continuous in the first derivative to the straight-ahead view.

6. The method of claim 1, wherein the at least one side peripheral, top peripheral, bottom peripheral and rear three-dimensional view is displayed at a low display quality as compared to the straight-ahead view.

7. An apparatus for generating a three-dimensional, immersed image display, the apparatus comprising:

(a) means for generating a straight-ahead three-dimensional view for display on a portion of a display area; and (b) means for generating at least one of a side peripheral, top peripheral, bottom peripheral and rear three-dimensional view for display on a contiguous substantial remainder of the display area, wherein the at least one side peripheral, bottom peripheral and rear three-dimensional view is continuous with the straight-ahead view.

8. The apparatus of claim 7, wherein the at least one side peripheral, top peripheral, bottom peripheral and rear three-dimensional view is distorted as compared to the straight-ahead view.

9. The apparatus of claim 7, wherein the at least one side peripheral, top peripheral, bottom peripheral and rear three-dimensional view is distorted to appear as if captured through a fish-eye lens.

10. The apparatus of claim 7, wherein means (b) comprises means for generating a left side peripheral and right side peripheral view for display on left and right portions of the display area, respectively.

11. The apparatus of claim 10, wherein:

the left and right side peripheral views are distorted as compared to the straight-ahead view; and the left and right side peripheral views are continuous in the first derivative to the straight-ahead view.

12. The apparatus of claim 7, wherein the at least one side peripheral, top peripheral, bottom peripheral and rear three-dimensional view is displayed at a low display quality as compared to the straight-ahead view.

13. A computer-readable medium having stored thereon a plurality of instructions, wherein the plurality of instructions, when executed by a processor, cause the processor to perform the steps of:

(a) generating a straight-ahead three-dimensional view for display on a portion of a display area; and (b) generating at least one of a side peripheral, top peripheral, bottom peripheral and rear three-dimensional view for display on a contiguous substantial remainder of the display area, wherein the at least one side peripheral top peripheral, bottom peripheral and rear three-dimensional view is continuous with the straight-ahead view.

14. The computer-readable medium of claim 13, wherein the at least one side peripheral, top peripheral, bottom peripheral and rear three-dimensional view is distorted as compared to the straight-ahead view.

15. The computer-readable medium of claim 13, wherein the at least one side peripheral, top peripheral, bottom peripheral and rear three-dimensional view is distorted to appear as if captured through a fish-eye lens.

16. The computer-readable medium of claim 13, wherein step (b) comprises the step of generating a left side peripheral and right side peripheral view for display on left and right portions of the display area, respectively.

17. The computer-readable medium of claim 16, wherein:

the left and right side peripheral views are distorted as compared to the straight-ahead view; and the left and right side peripheral views are continuous in the first derivative to the straight-ahead view.

18. The computer-readable medium of claim 13, wherein the at least one side peripheral, top peripheral, bottom peripheral and rear three-dimensional view is displayed at a low display quality as compared to the straight-ahead view.

19. A computer system, comprising:

a processor; and a memory coupled to the processor, wherein the memory stores a routine for generating a three-dimensional, immersed image display, wherein:

(a) a straight-ahead three-dimensional view is generated by the processor for display on a portion of a display area; and (b) at least one of a side peripheral, top peripheral, bottom peripheral and rear three-dimensional view is generated by the processor for display on a contiguous substantial remainder of the display area, wherein the at least one side peripheral top peripheral, bottom peripheral and rear three-dimensional view is continuous with the straight-ahead view.

20. The computer system of claim 19, wherein the at least one side peripheral, top peripheral, bottom peripheral and rear three-dimensional view is distorted as compared to the straight-ahead view.

21. The computer system of claim 19, wherein the at least one side peripheral, top peripheral, bottom peripheral and rear three-dimensional view is distorted to appear as if captured through a fish-eye lens.

22. The computer system of claim 19, wherein a left side peripheral and right side peripheral view are generated for display on left and right portions of the display area, respectively.

23. The computer system of claim 22, wherein:

the left and right side peripheral views are distorted as compared to the straight-ahead view; and the left and right side peripheral views are continuous in the first derivative to the straight-ahead view.

24. The computer system of claim 19, wherein the at least one side peripheral, top peripheral, bottom peripheral and rear three-dimensional view is displayed at a low display quality as compared to the straight-ahead view.

25. An apparatus for generating a three-dimensional, immersed image display, the apparatus comprising:

(a) means for generating a straight-ahead three-dimensional view for display on a portion of a display area; and (b) means for generating at least one of a side peripheral, top peripheral, bottom peripheral and rear three-dimensional view for display on a contiguous substantial remainder of the display area, wherein the at least one side peripheral, top peripheral, bottom peripheral and rear three-dimensional view is distorted to appear as if captured through a fish-eye lens.

26. An apparatus for generating a three-dimensional, immersed image display, the apparatus comprising:

(a) means for generating a straight-ahead three-dimensional view for display on a portion of a display area; and (b) means for generating a left side peripheral and right side peripheral view for display on left and right portions of the display area, respectively, said left and right portions comprising a contiguous substantial remainder of the display area.

27. The apparatus of claim 26, wherein:

the left and right side peripheral views are distorted as compared to the straight-ahead view; and the left and right side peripheral views are continuous in the first derivative to the straight-ahead view.

28. An apparatus for generating a three-dimensional, immersed image display, the apparatus comprising:

(a) means for generating a straight-ahead three-dimensional view for display on a portion of a display area; and (b) means for generating at least one of a side peripheral, top peripheral, bottom peripheral and rear three-dimensional view for display on a contiguous substantial remainder of the display area at a low display quality as compared to the straight-ahead view.

* * * * *